(12) United States Patent
Mueller et al.

(10) Patent No.: US 7,068,782 B2
(45) Date of Patent: Jun. 27, 2006

(54) COMMUNICATIONS DEVICES WITH RECEIVER EARPIECES AND METHODS THEREFOR

(75) Inventors: Karl F. Mueller, Sunrise, FL (US); David M. Yeager, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 585 days.

(21) Appl. No.: 10/184,278

(22) Filed: Jun. 27, 2002

(65) Prior Publication Data
US 2004/0001589 A1    Jan. 1, 2004

(51) Int. Cl.
*H04M 1/00*    (2006.01)
(52) U.S. Cl. .................................... 379/433.02
(58) Field of Classification Search ........... 379/433.02, 379/433.01; 455/90.3, 575.1, 575.5
See application file for complete search history.

(56) References Cited

U.S. PATENT DOCUMENTS

| 5,717,753 A | * | 2/1998 | Birmanns | 379/433.02 |
| 6,631,191 B1 | * | 10/2003 | Holmberg | 379/433.02 |
| 2002/0127974 A1 | * | 9/2002 | Song | 455/575.5 |

* cited by examiner

*Primary Examiner*—Jack Chiang
(74) *Attorney, Agent, or Firm*—Roland K. Bowler, II

(57) ABSTRACT

A communications receiver earpiece, for example in a cellular handset, including a sound-generating device (210) located on an inner portion of a housing, a sound port (130) extending through the housing from the inner portion thereof and emerging from an outer portion of the housing. A sound-port cover (140) is disposed over the sound port (130) on the outer portion of the housing. A portion 144 of the sound-port cover extending outwardly of the sound port where the sound port emerges from the out portion of the housing.

18 Claims, 3 Drawing Sheets

—PRIOR ART—

COMMUNICATIONS DEVICES WITH RECEIVER EARPIECES AND METHODS THEREFOR

FIELD OF THE DISCLOSURE

The present disclosure relates generally to communications devices, and more particularly to communications devices, for example, mobile wireless communications devices, having earpieces, receiver earpiece configurations, and methods therefor.

BACKGROUND

Some telephone receivers have high acoustic impedance, wherein the quality of the receiver's audio frequency response and the loudness decreases substantially with increasing sound leakage between the user's ear and the receiver ear cup. Many high acoustic impedance telephone receivers thus locate the speaker sound ports in a depression or in a cup that provides an effective seal with the user's ear. The development of increasingly smaller communications handsets has correspondingly reduced the receiver earpiece size, particularly on wireless communications handsets, which has made it increasingly difficult to provide an effective the earpiece seal required of high impedance acoustic impedance receivers.

Telephone receivers having low acoustic impedance are also known. In low acoustic impedance receivers, the quality of the receivers audio frequency response and the loudness is less dependent upon the seal between the earpiece and the user's ear, and thus these receivers tolerate some audio leakage. Leak-tolerant earpiece designs provide improved audio quality, but generally require additional parts and engineering.

In many communications handsets, the receiver earpiece is a single sound port, which is susceptible to blockage by soft ear tissue, resulting potentially in a substantial degradation of audio performance. The tendency to block the sound port is particularly problematic in smaller handsets, but is apparent nevertheless in larger handsets.

Prior art FIG. 5 illustrates a recess 50 on an outer surface of a receiver earpiece within which is located a sound port 60. The recess reduces some blockage of the sound port, but this recessed structure remains susceptible to blockage by the user's ear tissue.

The various aspects, features and advantages of the present disclosure will become more fully apparent to those having ordinary skill in the art upon careful consideration of the following Detailed Description with the accompanying drawings described below.

DETAILED DESCRIPTION

Figure 1:
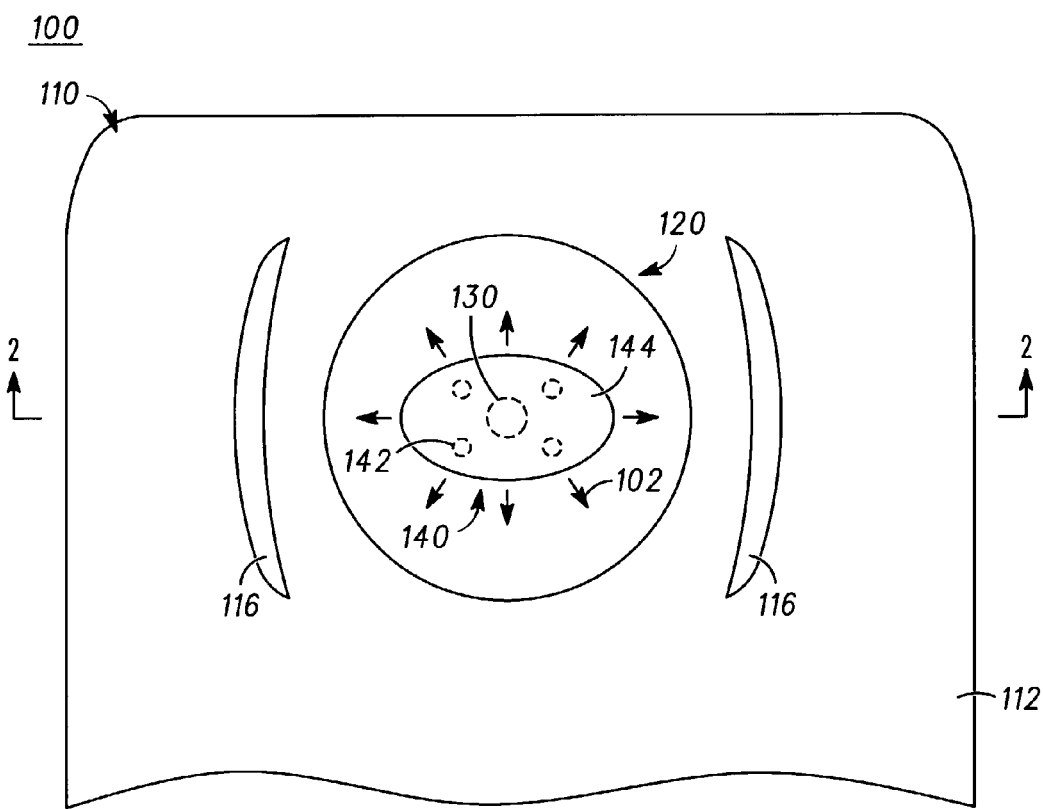
FIG. 1 is an exemplary communications handset receiver portion.
Figure 2:
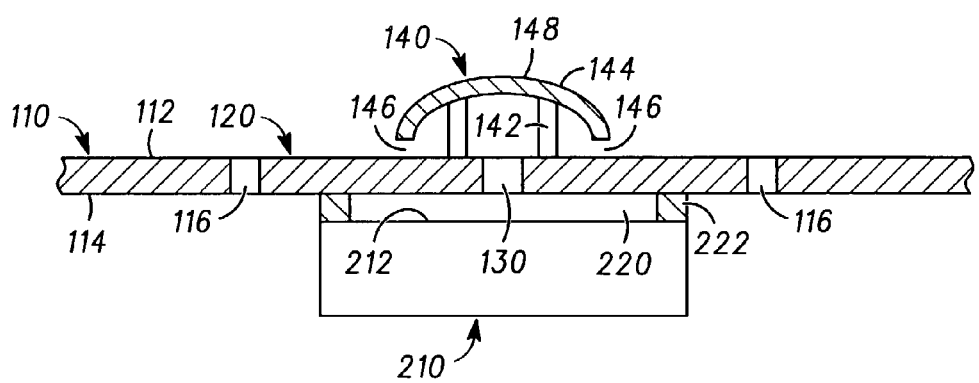
FIG. 2 is sectional view of an exemplary communications handset receiver portion of FIG. 1.

FIGS. 1 and 2 illustrate a portion of a communications receiver earpiece 100 comprises generally a housing 110 with an earpiece portion 120 disposed on a side portion 112 of the housing through which sound emanates for listening by a user when the earpiece portion 120 is held to or near the user's ear.

In FIG. 2, the communications receiver earpiece 100 includes an audible sound-generating device 210, for example, a loudspeaker or some other transducer, disposed on a side portion 114 of the housing 100 opposite the side 112 thereof on which the earpiece portion 120 is disposed. The transducer is usually disposed within the housing. Sound transmitted from an output side 212 of the transducer emanates generally through the housing at the receiver earpiece.

In the exemplary embodiment of FIG. 2, the output side 212 of the sound-generating device 210 is disposed generally opposite the earpiece portion 120, although in other embodiments the transducer may be located elsewhere within the housing and sound from the sound-generating device 210 may be communicated to the earpiece portion 120 via one or more sound conveying cavities on the inner side of the housing interconnecting the sound-generating device output portion 212 and the sound port 130 emerging at the housing earpiece portion 120.

In some embodiments, a cavity 220 between the transducer output 212 and the inner side 114 of the housing is fully enclosed, for example, with an interconnecting wall member 222. In other embodiments, the cavity 220 is vented, for example, with openings extending through the wall member 222.

In FIGS. 1 and 2, the exemplary housing earpiece portion 120 includes vents 116, which are optional, disposed on opposite sides of the sound port 130. In embodiments where the cavity 220 between the sound-generating device output and the housing is sealed the vents do not provide a direct sound path from the inner side of the housing to the outer side thereof. In other embodiments, sound may escape from the housing directly through the vents 116.

Figure 3:
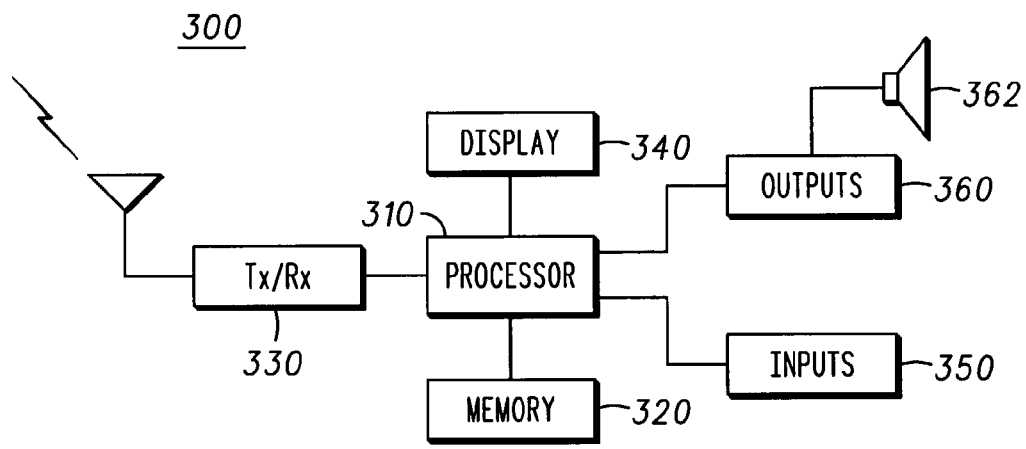
FIG. 3 is an electrical block diagram of an exemplary mobile wireless communications device.

In the exemplary embodiment, in FIG. 3, the communications earpiece receiver is part of a mobile wireless communications device 300, for example, a cellular telephone handset, comprising generally a processor 310 having associated therewith memory 320, including RAM and ROM and possibly other memory devices. In the exemplary embodiment, a radio transceiver 330 is also coupled to the processor, along with a display 340, inputs 350 including a keyboard/pad and microphone, and outputs 360 including an audio output 362, which is typically housed with the other components within the communications handset receiver.

In other embodiments, the communications receiver earpiece 100 constitutes a portion of some other communication device, for example, a telephone or intercom receiver housing only a transducer and possibly a microphone. The communications receiver earpiece may also be disposed on a headset or on a discrete earpiece device.

The receiver earpiece portion may be in the form of a depression or a protrusion in or on the housing side portion. In the exemplary embodiment of FIG. 1, the earpiece portion 120 follows the contour of the outer housing portion 112, which is flat in the exemplary embodiment. In other embodiments, more generally, the contour of the outer housing surface may be curved.

In some embodiments, the earpiece portion is a high acoustic impedance earpiece, and in other embodiments the earpiece portion is a low acoustic impedance earpiece. High acoustic impedance earpieces are sometimes embodied in or as a recess or a cup to reduce leakage between the user's ear and the earpiece.

In FIG. 2, the housing 110 comprises at least one sound port 130 disposed through the housing, between the outer portion 112 of the housing and the inner portion 114 thereof. The sound port 130 provides a conduit through which sound propagates from the sound-generating device from within the housing to the receiver earpiece.

Figure 4:
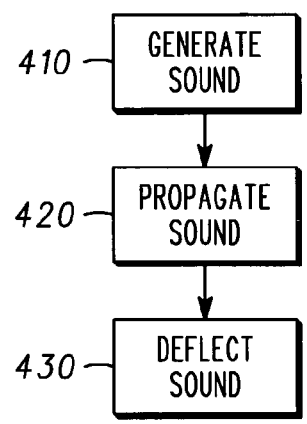
FIG. 4 is a process flow block diagram.
Figure 5:
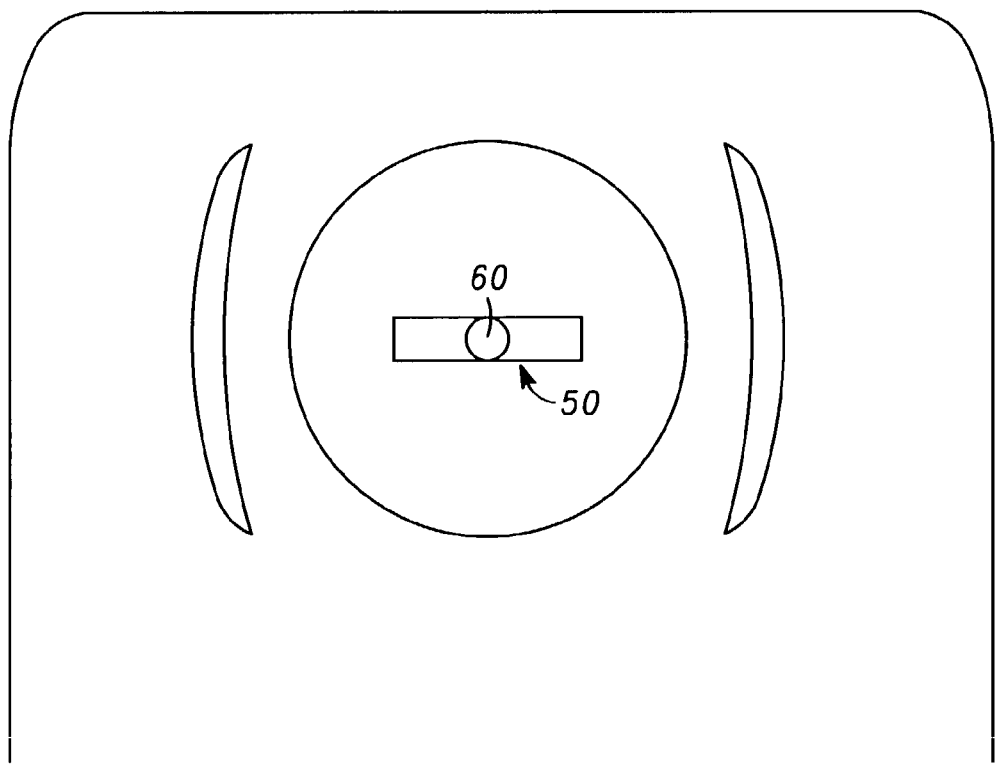
FIG. 5 is a prior art receiver earpiece.

In FIG. 4, at block 410, an audio sound is generated on one side of the receiver housing, and at block 420, the audio sound propagates through a sound port from the side of the receiver housing on which the sound is generated to a receiver earpiece on an opposite side of the receiver housing.

In FIGS. 1 and 2, a sound-port cover 140 comprising a top portion and substantially open side portions is disposed over and spaced apart from the sound port 130 on the outer side portion of the housing 110. The sound-port cover 140 is thus spaced apart from the side portion of the housing 110 where the sound port 130 is located, providing a space between the sound-port cover 140 and the outer portion 112 of the housing. In FIGS. 1 and 2, a portion 144 of the sound-port cover 140 extends outwardly of where the sound port 130 emerges from the outer side of the housing, preferably outwardly of all sides thereof.

In the exemplary embodiment, the sound-port cover 140 is coupled to the housing by one or more posts 142, which may be fastened to, or formed unitarily with, either one of or both of the sound-port cover 140 and the housing 110. In some embodiments, the one or more posts 142 are snap-fit assembled with either or both of the housing and sound-port cover.

The exemplary housing sound-port cover 140 protrudes above the housing outer surface 112, thus providing a tactile locating guide to facilitate alignment of the receiver earpiece relative to a user's ear. This feature is desirable in some handsets. In other embodiments, the sound-port cover 140 may be recessed partially or fully relative to the outer housing surface 112, for example, by locating the cover 140 in a recessed earpiece portion.

In FIG. 1, the exemplary sound-port cover 140 has a generally convex outer surface 148, but in other embodiments the outer surface may have a generally convex surface, for example, in embodiments where the sound-port cover is partially recessed in a depression of the housing. The outer surface of the sound-port cover may also have other shapes.

In FIG. 1, the sound-port cover 140 has a generally oblong shape extending across the exemplary handset housing. In other embodiments, however, the sound-port cover 140 may be oriented differently, for example, vertically. The sound-port cover 140 may also have other shapes, for example, a circular shape.

In FIG. 2, a cover sound port 146 is disposed between the outer portion of the housing and the portion of the housing sound-port cover 144 that extends outwardly of the housing sound port. In FIG. 1, the cover sound port extends in all directions outwardly from the space between the housing sound-port cover and the housing, except where obstructed by the support members 142.

In FIG. 4, at block 430, audio sound emerging from the sound port on the second side of the receiver housing is deflected by the sound port cover, which is disposed over the sound port and spaced apart from the second side of the housing. In FIG. 1, the audio sound is directed substantially radially, as indicated by arrows 102, through the cover sound port openings between the sound port cover and the second side of the receiver housing.

While the present disclosure and what is considered presently to be the best modes thereof have been described in a manner that establishes possession thereof by the inventors and that enables those of ordinary skill to make and use the same, it will be understood and appreciated that there are many equivalents to the exemplary embodiments disclosed herein and that myriad modifications and variations may be made thereto without departing from the scope and spirit of the disclosure, which is to be limited not by the exemplary embodiments but by the appended claims.

What is claimed is:

1. A communications handset, comprising:
   a housing;
   a sound-generating device disposed within the housing;
   a housing sound port disposed through the housing between an inner portion of the housing and an outer portion of the housing;
   a housing sound-port cover non-movably coupled to the outer portion of the housing and spaced apart from the outer portion of the housing where the housing sound port emerges,
   the housing sound-port cover located over the housing sound port, a portion of the housing sound-port cover extending outwardly of the housing sound port,
   a space between the housing sound-port cover and the outer portion of the housing where the housing sound port is located, a cover sound port extending radially outwardly from the space between the housing sound-port cover and the outer portion of the housing,
   the housing sound-port cover not extending beyond a side of the housing.

2. The communications handset of claim 1, the cover sound port extending in substantially all directions radially outwardly from the space between the housing sound port cover and the outer portion of the housing.

3. The communications handset of claim 1,
   a receiver earpiece portion disposed on the outer portion of the housing, the housing sound port located within the earpiece portion,
   the cover sound port emerging from an open side of the housing sound-port cover on a front side of the housing.

4. The communications handset of claim 3, the earpiece portion is a high acoustic impedance earpiece.

5. The communications handset of claim 3, the earpiece portion is a low acoustic impedance earpiece.

6. The communications handset of claim 1 is a mobile wireless communications handset, a processor having an audio output coupled to the sound-generating device, a transceiver coupled to the processor, a keypad coupled to the processor and a display coupled to the processor.

7. The communications handset of claim 1, the housing sound port extending from a space between the inner portion of the housing and the sound-generating device to the outer portion of the housing, the housing sound-port cover extending outwardly of all portions of the housing sound port.

8. The communications handset of claim 1, the housing sound-port cover including a top portion and substantially open side portions.

9. A communications receiver earpiece, comprising:
   a housing having inner and outer portions disposed between opposite sides of the housing;
   a sound-generating device located on the inner portion of the housing;
   a sound port extending through the housing from the inner portion of the housing to the outer portion thereof, the sound port emerging from the outer portion of the housing,
   a sound-port cover disposed over the sound port on the outer portion of the housing within the opposite sides of the housing, the sound port cover spaced apart from and coupled to the outer portion of the housing, a portion of the sound port cover extending outwardly of the sound port where the sound port emerges from the out portion of the housing, sound openings in communication with the sound port, the sound openings emanating from between the sound-port cover and the outer port of the housing, side portions of the sound-port cover are substantially open.

10. The communications receiver earpiece of claim 9, the sound-port cover including a top portion.

11. The communications receiver earpiece of claim 9, the sound port interconnecting an inner space on the inner portion of the housing with an outer space on the outer portion of the housing, the outer space on the outer portion of the housing disposed between the outer portion of the housing and sound-port cover.

12. The communications receiver earpiece of claim 9, the sound-port cover has a generally convex surface.

13. The communications receiver earpiece of claim 9, the earpiece portion is a high acoustic impedance earpiece.

14. The communications receiver earpiece of claim 9, the earpiece portion is a low acoustic impedance earpiece.

15. The communications receiver earpiece of claim 9, the sound-port cover extending substantially radially outwardly of all portions of the sound port.

16. The communications receiver earpiece of claim 15, the sound port is not more than a single sound port.

17. A method in a communications receiver earpiece, comprising:

generating an audio sound on a first side of a receiver housing;

propagating the audio sound from the first side of the receiver housing through a sound port to a receiver earpiece on a second side of the receiver housing opposite the first side thereof;

deflecting a portion of the audio sound on the second side of the receiver housing with a sound port cover disposed over the sound port and spaced apart from the second side of the housing, the audio sound directed substantially radially through openings between the sound port cover and the second side of the receiver housing, the deflected sound emanating from beneath the sound port cover along the receiver earpiece on the second side of the receiver housing.

18. The method of claim 17, providing a tactile cue for locating the earpiece with the sound port cover by protruding the sound port cover relative to a portion of the second side of the receiver housing.

* * * * *